US007073934B2

(12) United States Patent
Mazza et al.

(10) Patent No.: US 7,073,934 B2
(45) Date of Patent: Jul. 11, 2006

(54) KNEADING MACHINE FOR FOOD DOUGHS, PARTICULARLY FOR BAKERY PRODUCTS

(75) Inventors: Giovanni Mazza, Gironico (IT); Davide Drocco, Alba (IT)

(73) Assignee: Sancassiano, Roddi d'Alba (Cuneo) (IT)

(*) Notice: Subject to any disclaimer, the term of this patent is extended or adjusted under 35 U.S.C. 154(b) by 97 days.

(21) Appl. No.: 10/377,736

(22) Filed: Mar. 4, 2003

(65) Prior Publication Data
US 2003/0167931 A1    Sep. 11, 2003

(30) Foreign Application Priority Data
Mar. 5, 2002  (IT) .......................... MI2002A0454
Nov. 26, 2002 (IT) .......................... TO2002A1020

(51) Int. Cl.
*B01F 9/12* (2006.01)
(52) U.S. Cl. .......................... 366/94; 366/95; 366/222; 366/224
(58) Field of Classification Search ............ 366/64–67, 366/94, 95, 97, 98, 200, 221, 222, 224, 244, 366/245, 253, 297, 302, 206, 309, 306, 288
See application file for complete search history.

(56) References Cited

U.S. PATENT DOCUMENTS

| 293 | A | * | 8/1837 | Bauder ........................ 366/297 |
| 131,877 | A | * | 10/1872 | Hart ........................... 366/306 |
| 158,365 | A | * | 1/1875 | Finley ......................... 366/245 |
| 244,226 | A | * | 7/1881 | Gelhart ........................ 366/306 |
| 376,625 | A | * | 1/1888 | Barnesley .................... 366/297 |
| 2,115,742 | A | * | 5/1938 | Newton ....................... 366/222 |
| 4,050,369 | A | * | 9/1977 | Mulvihill et al. ............. 99/463 |
| 4,765,746 | A | * | 8/1988 | Suay Puig ................... 366/77 |
| 6,652,137 | B1 | * | 11/2003 | Bosch et al. ................ 366/288 |
| 2004/0213078 | A1 | * | 10/2004 | Drocco ........................ 366/94 |
| 2005/0111295 | A1 | * | 5/2005 | Drocco ........................ 366/97 |

FOREIGN PATENT DOCUMENTS

| DE | 842182 | * | 6/1952 |
| EP | 1 342 501 A3 | * | 11/2003 |
| JP | 8-309171 A | * | 11/1996 |

* cited by examiner

*Primary Examiner*—David Sorkin
(74) *Attorney, Agent, or Firm*—Sughrue Mion, PLLC (57) ABSTRACT

The invention relates to a kneading machine which comprises a substantially cylindrical bowl for containing a mass to be kneaded and a pair of kneading tools rotatable within the bowl with the same direction of rotation, around two axes parallel to the axis of the bowl, so as to define two theoretical cylinders which are substantially tangent both to each other and to the circumferential wall of bowl. Each kneading tool comprises at least one arm which extends substantially on the periphery of the respective theoretical cylinder, so that each arm has an orbital movement around the respective axis of rotation. Each kneading arm is substantially straight for at least one part of its length and is parallel or slightly incline with respect to a generatrix of the respective theoretical cylinder. Preferably the rotations of the two arms are synchronize with each other so that the two arms pass substantially simultaneously at the area where the two respectively theoretical cylinders are tangent to each other.

18 Claims, 11 Drawing Sheets

Fig_1

Fig_2

Fig_3

Fig_4

Fig_6A

Fig_6B

Fig_7A

Fig_7B

Fig_9A

Fig_11

KNEADING MACHINE FOR FOOD DOUGHS, PARTICULARLY FOR BAKERY PRODUCTS

The present invention relates to kneading machines for food doughs, particularly for bakery products, of the type comprising a substantially cylindrical bowl and at least two kneading tools rotatable within the bowl in the same direction of rotation, around two axes which are substantially parallel to the bowl axis, so as to define two theoretical cylinders which are substantially tangent both to each other, and to the circumferential wall of the bowl.

Ensuring a proper kneading action in these machines is a critical problem, since it is necessary to satisfy a plurality of needs. The quality of the kneading action greatly affects the quality of the bakery products which are obtained by baking the dough. It is clearly evident that there is the need that kneading is carried out homogeneously throughout the entire mass of dough. Furthermore, it is essential that the energy spent for the kneading action is kept to the minimum possible value, which makes the efficiency of the machine higher. This is required for obvious needs of energy saving and in order to limit the stresses imposed to the kneading tools, which affect also the dimensioning of the components of the machine. Furthermore, due to the kneading action, some energy is transferred to the mass of dough, with a resulting increase in its temperature.

It is also to be noted that it is beneficial for the dough that it is "cut", i.e. it is divided by the kneading tools during kneading, since this action is important for starting enzymatic reactions within the dough. However, this cutting action must not be obtained with a high speed of the kneading tools, which would involve an unacceptable increase of the kneading effort and an excessive stress in the dough mass.

A kneading machine of the type indicated at the beginning of the present description is disclosed for instance in European patent EP 0 354 190 B1, and in corresponding U.S. Pat. No. 4,919,539 of the same Applicant. In this machine, the two kneading tools are in form of helical spirals, and impress a force onto the dough in the direction of the bottom of the bowl. Notwithstanding this solution is advantageous and has been successfully used for a long time, it is not optimal from the stand point of the needs which have been indicated in the foregoing.

It is instead a basic purpose of the present invention that of providing a kneading machine of the type which has been indicated at the beginning wherein the mass of the dough receives a minimum mechanical stress during the kneading action, while being mixed and kneaded completely and homogeneously, and in a relatively short time.

For these reasons, completely satisfactory results are not obtained by conventional kneading machines, such as the conventional machines in which the kneading tool moves along a circular path in which it subsequently sinks in the mass of dough and then comes out therefrom, which have the disadvantage of a poor kneading uniformity, a poor efficiency and insufficiently smooth treatment of the mass of dough.

A further preferred purpose of the invention is that of providing a machine of the above indicated type which gives rise to a cutting action on the mass of dough during kneading, in order to obtain the best possible development of enzymatic reactions in the dough, by providing a contact with the atmosphere on large surfaces of the mass of dough, which are well distributed throughout the entire mass, at subsequent stages. A further beneficial result which is desired is that of a stretching and "opening" action on the dough, thus is better oxygenated.

The kneading machine according to the invention comprises, as already indicated above, a substantially cylindrical bowl and at least two kneading tools which are rotatable within the bowl, with the same direction of rotation, around two axes which are substantially parallel to the axis of the bowl, so as to define two theoretical cylinders which are substantially tangent both to each other, and to the circumferential wall of the bowl, and is further characterized in that.

each kneading tool comprises at least one arm, each arm extends substantially on the periphery of the theoretical cylinder having its axis coincident with the respective axis of rotation of the arm, so that said arm follows an orbital movement around its axis of rotation, each arm, is substantially straight at least for a part of its length and arranged along a direction substantially parallel or slightly inclined with respect to a generatrix of the respective theoretical cylinder.

Preferably, the orbital movements of said arms around their respective axes of rotation are synchronized with each other, so that the arms pass substantially simultaneously through the area where the theoretical cylinders are tangent to each other, crossing each other with opposite directions of movement as a result of that the two tools rotate in the same direction.

Due to the above indicated features, the kneading machine according to the invention is able to provide a dough of excellent quality. This is due in particular to the cutting action to which the dough is subjected each time that the two arms of the kneading tools pass through the area where the respective theoretical cylinders are tangent to each other, by crossing each other with opposite directions of movement.

In a preferred embodiment, the two said theoretical cylinders of the two kneading tools have substantially identical diameters and substantially identical heights and the speeds of rotation of the two arms are also substantially identical. However, it is also possible that the two theoretical cylinders have diameters and/or heights which are different from each other and the two kneading tools move with different speeds.

Furthermore, it is also possible that the rotations of the two kneading tools are out of phase by a predetermined amount relative to each other, so that the two arms pass through the area where the theoretical cylinders are tangent to each other at two subsequent times, so that a predetermined distance is left when they are at the minimum distance from each other. This feature can be useful in the case of doughs which are particularly hard or difficult to be kneaded.

Also with reference to a further preferred feature of the invention, within the bowl no further members are provided, beside the kneading tools.

Preferably, the theoretical cylinders of the two kneading tools each have a sufficiently great diameter so that each of these cylinders, viewed in the direction of its axis, is not contained within a single quarter of the bowl (where "quarter" means one of the four sectors of the bowl defined by two diametrical planes of the bowl which are orthogonal to each other). Also in the case of the preferred embodiment, the plane to which the two theoretical cylinders are both tangent is also a diametrical plane of the bowl.

Yet a further preferred feature of the invention lies in that the cross-section of each of said arms defines a substantially cutting edge along the cylindrical surface of the respective theoretical cylinder. By this feature the cutting action obtained when the two arms cross each other is increased.

Further advantageous variants of the invention are defined in the annexed claims.

The invention will be now described in detail with reference to the annexed drawings, given purely by way of non limiting example, in which.

The machine of FIGS. 1–4 comprises a basement 10 and a column 11 from which a head 12 projects in a cantilever fashion, so as to hang over the basement. On the basement there is mounted a support 14 carried by a rotatable shaft 15 having an axis 15a. The shaft 15 is driven in rotation by a transmission 16 driven by a motor 17. The transmission is shown diagrammatically, since it can be made according to various possible equivalent configurations, as easily understood.

Figure 1:
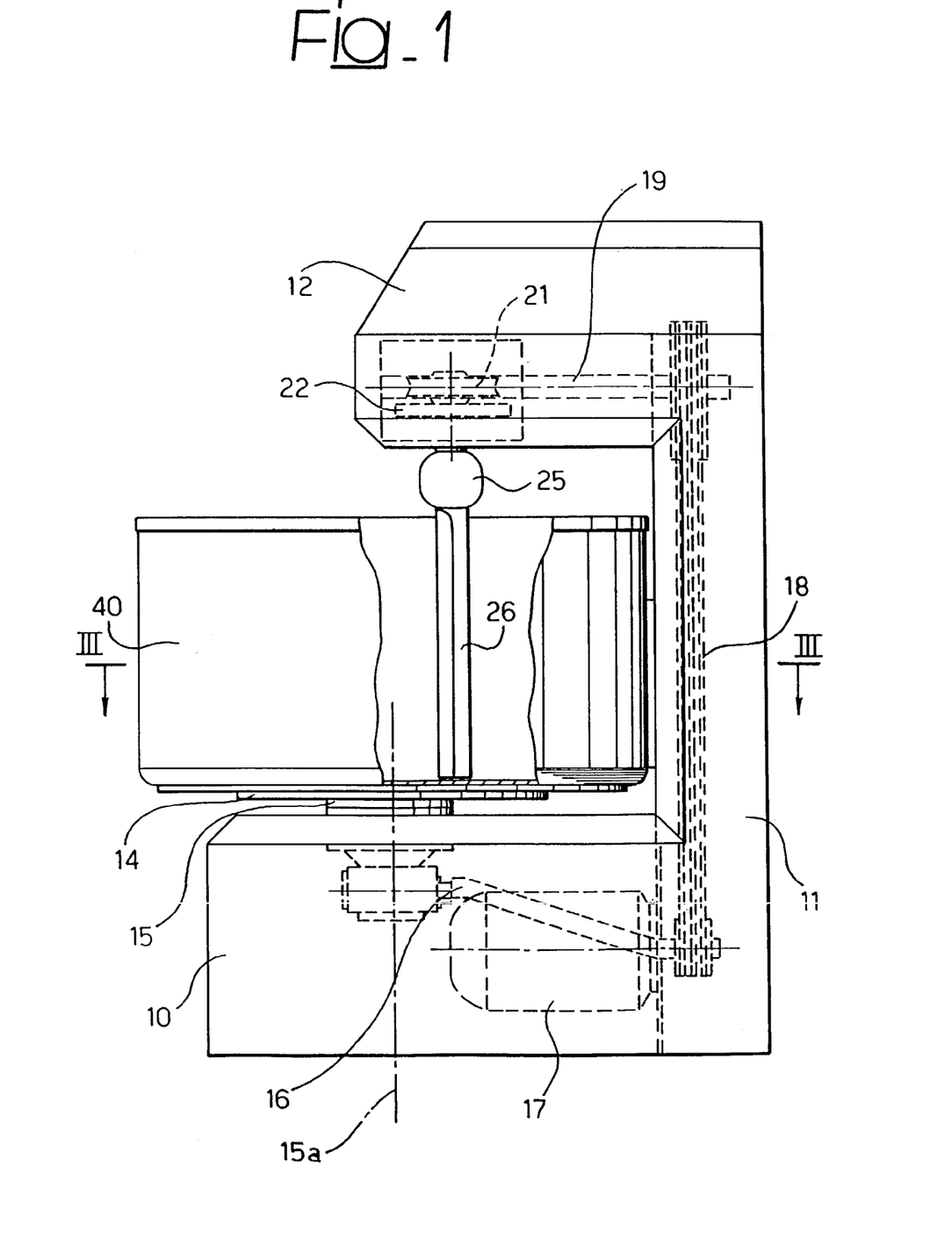
FIG. 1 shows a front view of the machine.
Figure 2:
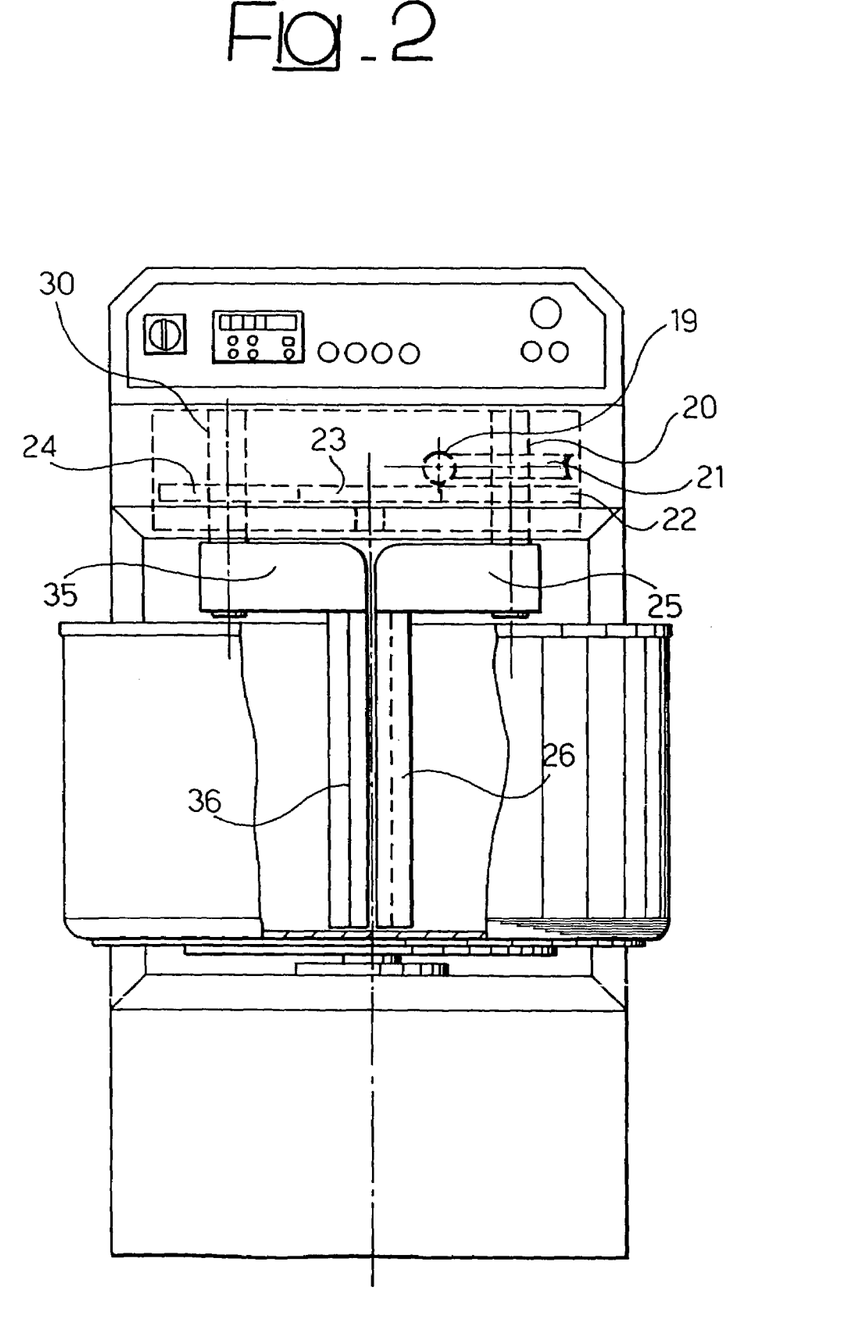
FIG. 2 shows a side view.
Figure 3:
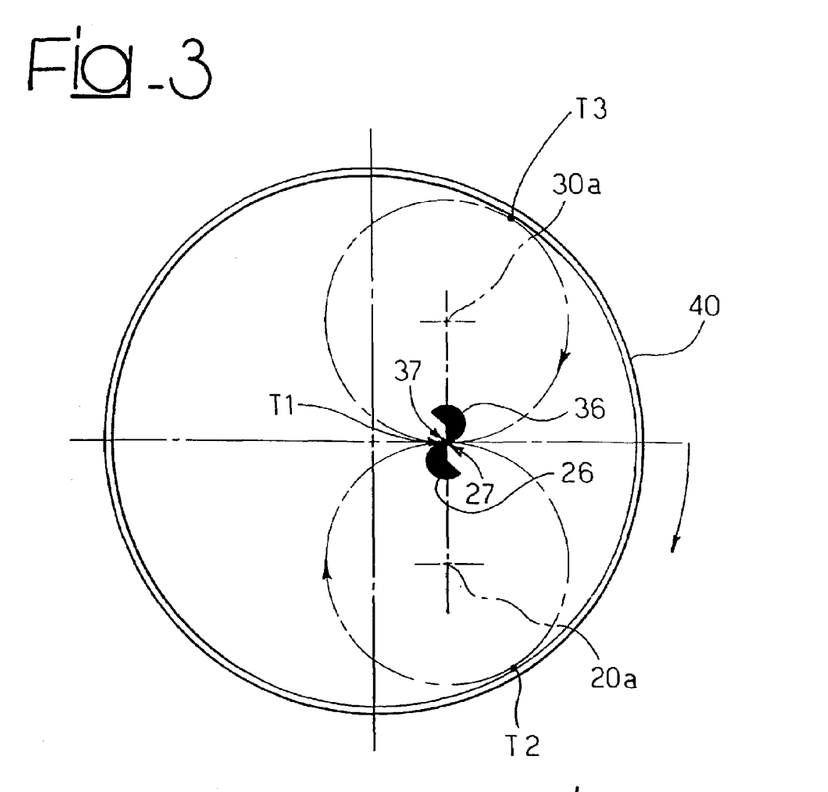
FIG. 3 is a diagrammatic cross-section taken along line III—III of FIG. 1.

Motor 17 also drives a belt transmission 18 for rotating the shaft 19 supported by the head 12 which drives a vertical shaft 20 through an orthogonal gear 21. On the vertical shaft 20 there is mounted a gear 22 which drives rotation of a gear 24 mounted on a shaft 30 through an intermediate gear 23. On shafts 20 and 30, which rotate in the same direction and are supported by the head 12, there are fixed horizontal arms 25 and 35 which on their turn extend into vertical arms 26 and 36. Arms 26 and 36 are received within the cylindrical bowl 40 which is removably connected to support plate 14 and has its central axis coincident with axis 15a of shaft 15. The action of the kneading arms 26 and 36 is better explained with reference to the diagrams of FIGS. 3 and 4. As shown in FIG. 3, the axes 20a and 30a of shafts 20 and 30 lie on a chord of the circle representing the cross-section of bowl 40. The length of the radial arms 25 and 35 is such that the kneading arms 26 and 36 define respective theoretical cylinders which are substantially tangent to each other at an area T1. Furthermore, the position of shafts 20 and 30 is chosen so that the theoretical cylinders defined by arms 26 and 36 are substantially tangent to the wall of the bowl 40, at areas respectively designated by T2 and T3.

For an efficient operation of the machine, the transmission ratios between motor 17 and shafts 15 and 20–30 respectively are chosen so that the tangential speed of arms 26 and 36 is greater than the tangential speed of the side wall of the bowl 40.

Figure 4:
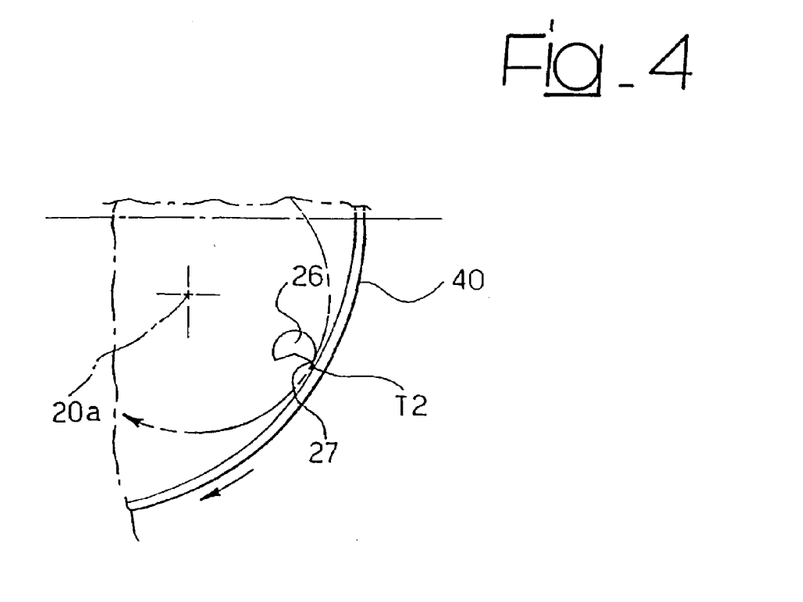
FIG. 4 is an enlarged view of a detail of FIG. 3, FIG. 5A, 5B show a perspective view and a plan view of a further embodiment of a kneading tool of the machine according to the invention.

As better shown in FIG. 4, arms 26, 36 preferably have a polygonal section, which has a sharp edge, forming a cutting edge, at the area of the arm facing in the direction of movement and towards the outside of the circular path followed by the arm. In the embodiment shown, this edge is respectively designated by 27 and 37 for the two arms 26, 36.

The operation of the above described machine can be clearly understood from the foregoing description of the structure thereof. Actuation of motor 17 causes rotation both of the bowl 40 and the arms 26, 36. Even a slow rotation of the bowl, such as between 5 and 10 rounds per minute, ensures that the entire mass of dough introduced therein is affected by the action of the kneading arms 26, 36. The kneading arms rotate at a greater speed (such as 30–50 rounds per minute) and perform a generic kneading action on the mass of dough, imparting a strong cutting action thereon due to that the rotation of the two arms 26, 36 is synchronized so that these arms pass substantially simultaneously at the area where the respective theoretical cylinders are tangent to each other. The cutting effect at the area T1 is clearly understood: each of the arms 26, 36 tends to move the dough in the direction opposite to that of the other arm, so that at the area T1 a substantially shear-like action is exerted, particularly with the aid of the cutting edges. After the arms have crossed each other and the dough have been cut, the arms move away from each other due to their rotation causing thereby an "opening" of the mass so that the latter is extensively placed in contact with the air and is thus oxygenated and prevented from heating.

At the areas in the surrounding of T2 and T3, each arm moves closer to the wall of the bowl with a tangential speed which is greater than the speed of the wall, so that the arm strongly penetrates in the mass held by the wall of the bowl 40, also due to the presence of the front cutting edge formed on the kneading arm.

Since the path of arms 26, 36 is such that these arms come in close proximity to the wall, also a cleaning action on the wall is obtained, so that there are no areas in the bowl left where some material may remain or adhere so as to be not subjected to a mixing and kneading action. For this reason, it is preferable that the length of the arms is such that their free end comes in close proximity to the bottom of the bowl.

As indicated, the embodiment described above is given by way of example and various variants in the configuration thereof may be adopted without departing from the scope of the present invention.

The shape of the cross-section of the kneading arms may be varied, while preferably always providing a cutting edge which favours penetration of the arm into the mass, for performing a cutting action.

The ratio between the diameter of the path of the kneading arms and the diameter of the bowl is not critical and depends from the distance between the chord on which the axes of rotation of the two kneading tools are located and the centre of the bowl. If this distance is lower than the radius of the theoretical cylinders defined by two arms, as in the illustrated embodiment, it is possible to obtain a satisfactory combination of the cutting action and the mixing action. In general the configuration of the machine and the apparatus for transmitting the movements can be chosen with a great freedom while adopting the essential features which form the subject of the following claims.

Naturally, furthermore, the general configuration of the machine can also be completely different from that described above purely by way of example. It is possible for instance to provide a column 11 of telescopic type, in order to enable the head above the bowl to be raised for withdrawing arms 26, 36 from the bowl and allowing easy removal of the bowl itself in view of emptying the bowl from the material contained therein.

Theoretically, it is also possible to provide a further variant, which will be described in detail in the following, in which the machine is provided with a single kneading tool of the above described type, which cooperates with a fixed cooperating member which projects downwardly from the head of the machine, within the rotating bowl. This fixed cooperating member may be formed by an arm arranged at a fixed position where the theoretical cylinder of the single kneading tool is tangent to a diametrical plane of the bowl. In this case, the cutting effect is due to the action of a single rotating arm and the cooperating fixed member.

A further possible variant may consist in providing more than two kneading tools cooperating with each other. In this case, it is possible also to provide a non rotatable bowl, since the movement and the exchange of dough within the bowl are obtained due to the action of the kneading tools which are mutually tangent in pairs.

Figures 5A, 5B:
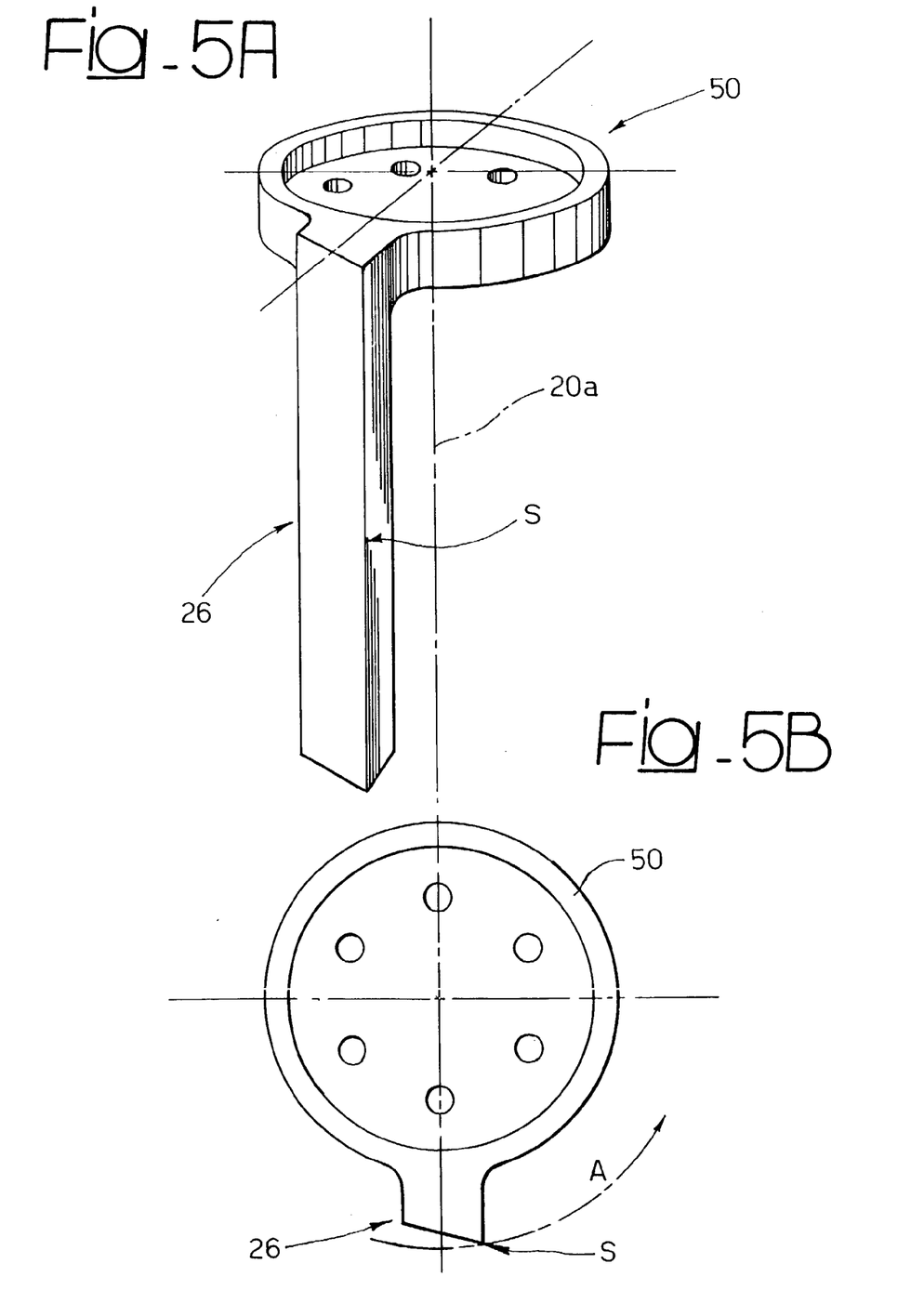

FIG. 5A shows a perspective view of a further embodiment of one of the two kneading tools of the machine of FIGS. 1–4. The kneading tool shown in FIG. 5A, as well as in the plan view of FIG. 5B, designated by reference number 26, preferably has a cross-section in form of a right-angled trapezium (see FIG. 5B) so as to define a front edge, with reference to the direction of rotation (designated by arrow A in FIG. 5B) which is a cutting edge S able to cause a stretching action and subsequently a clear cut in the dough each time that it passes across the other kneading tool 36 of the machine (which naturally may have an identical configuration). In the embodiment of FIGS. 5A, 5B the kneading tool 26 is constituted by a straight arm, parallel to any generatrix of the theoretical cylinder which is defined thereby in the rotation around axis 20a. The figures show a solution where the arm formed in the tool 26 extends from an upper disc 50, which is for coupling to the respective driving shaft.

Figures 6A, 6B:
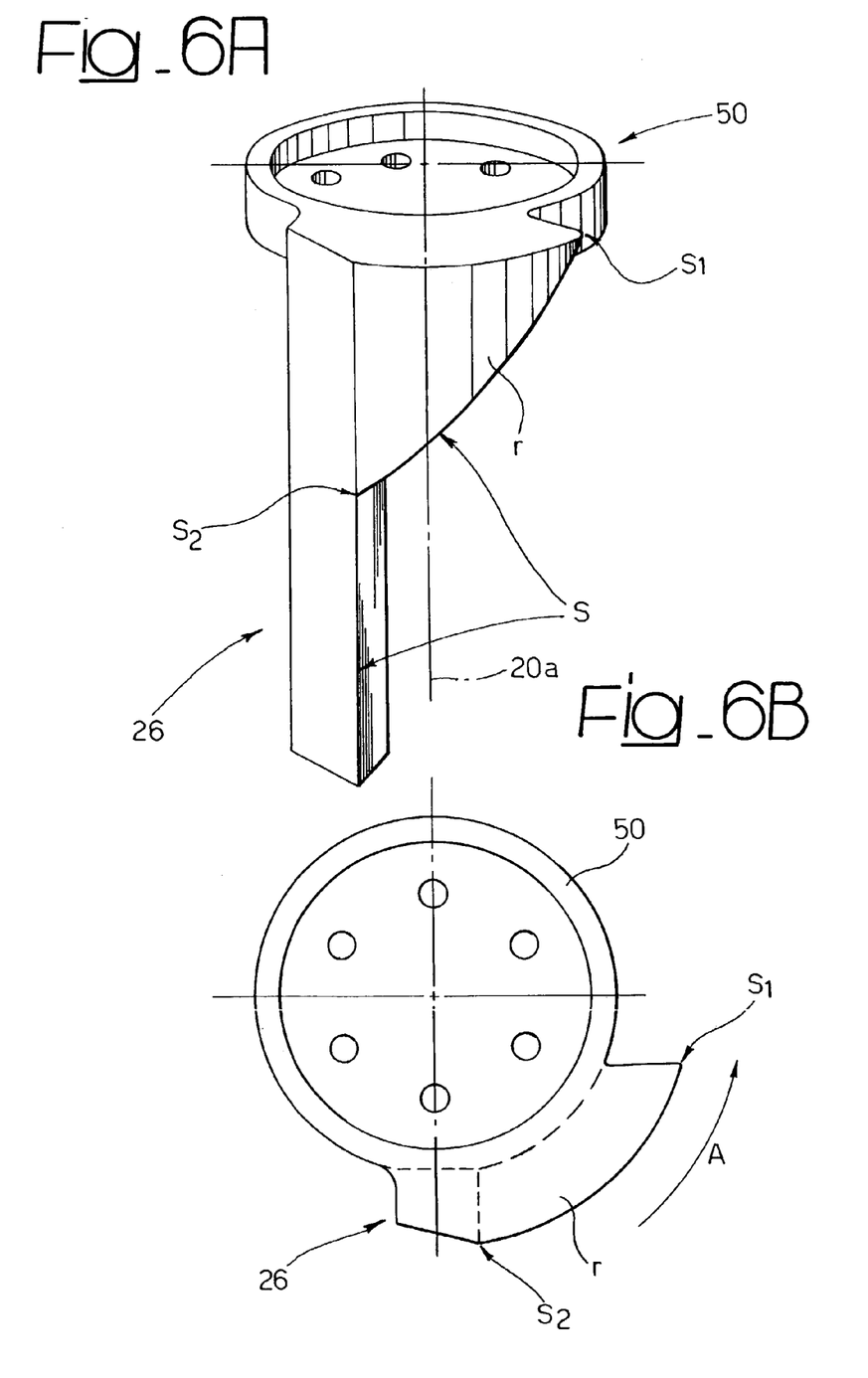
FIGS. 6A, 6B show a perspective view and a plan view of a still further embodiment of a kneading tool of the machine according to the invention.

FIGS. 6A, 6B show a variant of the kneading tool of FIGS. 5A, 5B in which the arm 26 extends from the coupling disc 50 with a root portion r having a substantially triangular shape, with a width progressively decreasing downwardly from the coupling disc 50. The portion r has one edge whose ends are designated in FIG. 6A by $S_1$, $S_2$ which lies on the surface of the theoretical cylinder defined by arm 26 and is strongly inclined with respect to a generatrix of this theoretical cylinder. Therefore, the edge S of the kneading tool has a greater extension with respect to the solution shown in FIGS. 5A, 5B. The object of portion r is first of all that of increasing the cutting action due to the greater length of edge S. The portion of the cutting edge S corresponding to that between $S_1$, and $S_2$ is arranged on the same theoretical cylinder on which the lower portion of edge S of arm 26 is arranged. A further advantage of the provision of portion r is that, due to the inclined arrangement of its edge, during the cutting action it pushes the cut dough downwardly avoiding thereby that the dough is twisted around the kneading tool and lines thereon. A further advantage of portion r is that of strengthening the arm 26 due to a great increase of its cross-section at the connecting area to disc 50.

Figures 7A, 7B:
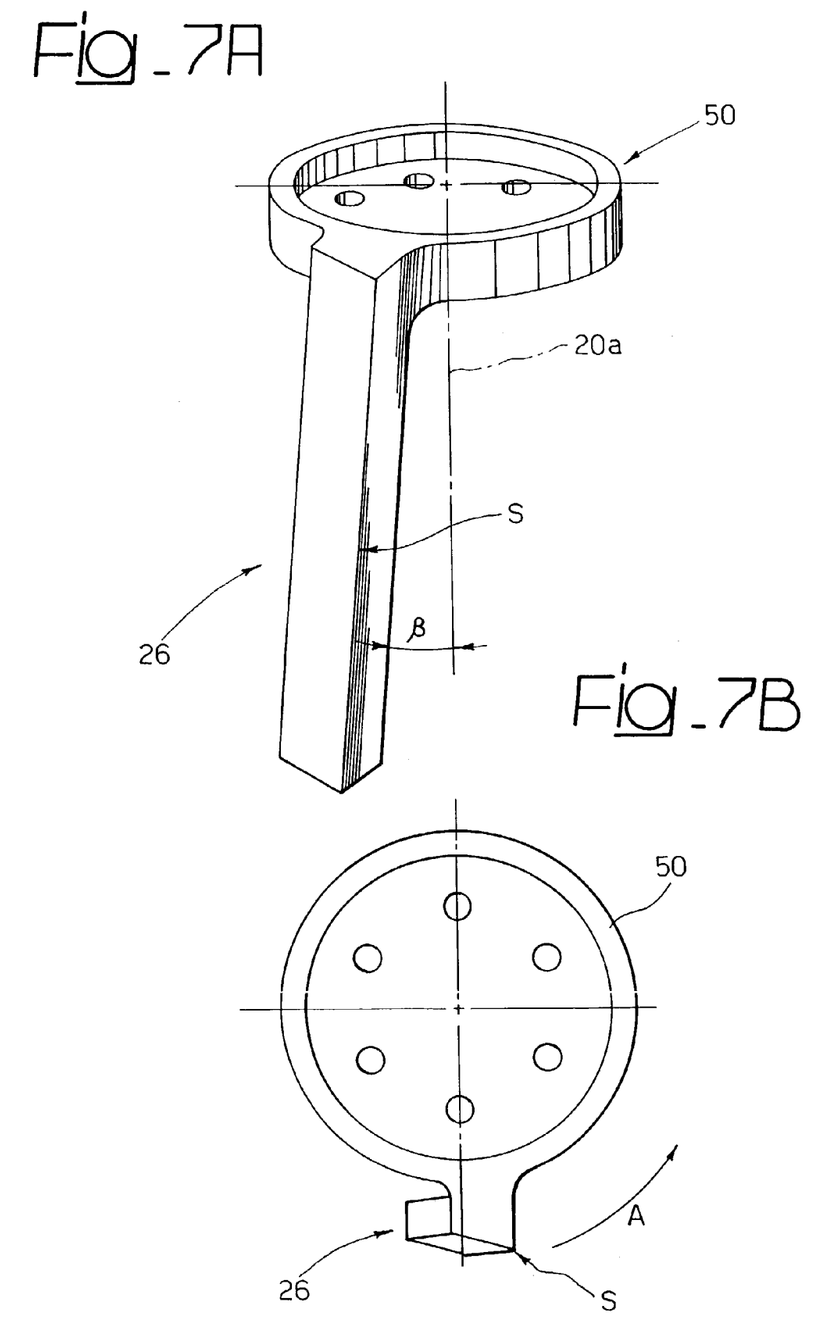
FIGS. 7A, 7B show a perspective view and a plan view of a still further embodiment of a kneading tool of the machine according to the invention.

FIGS. 7A, 7B show a further a variant of the solution of FIGS. 5A, 5B, in which arm 26 is again straight but arranged according to a direction which is slightly inclined with respect to a generatrix of the theoretical cylinder defined by the kneading tool in its rotation.

Studies and tests conducted by the Applicant have shown that the angle β formed between arm 26 of the solution of FIG. 7A, 7B and any generatrix of the respective theoretical cylinder, may be comprised between 0° and 10°. The solution shown relates specifically to a case in which angle β is 4.5°, which value has demonstrated to be particularly advantageous. However, other values may be adopted within the range of values which has been indicated. Angles much greater than 10° are not advisable since arm 26 is straight, whereby its opposite ends rotate on different orbital paths with respect to the axis of rotation of the tool. Thus, when the two tools cross each other, the mutual distance of the cutting edges S is not uniform along the length of the arms, which poses a limit to the possibility of inclining each arm while keeping the cutting effect during the kneading action. Therefore, the expression "slightly inclined", wherever used in the present description and in the following claims, must be interpreted as meaning an angle which is not considerably greater than 10°.

Figures 8A, 8B:
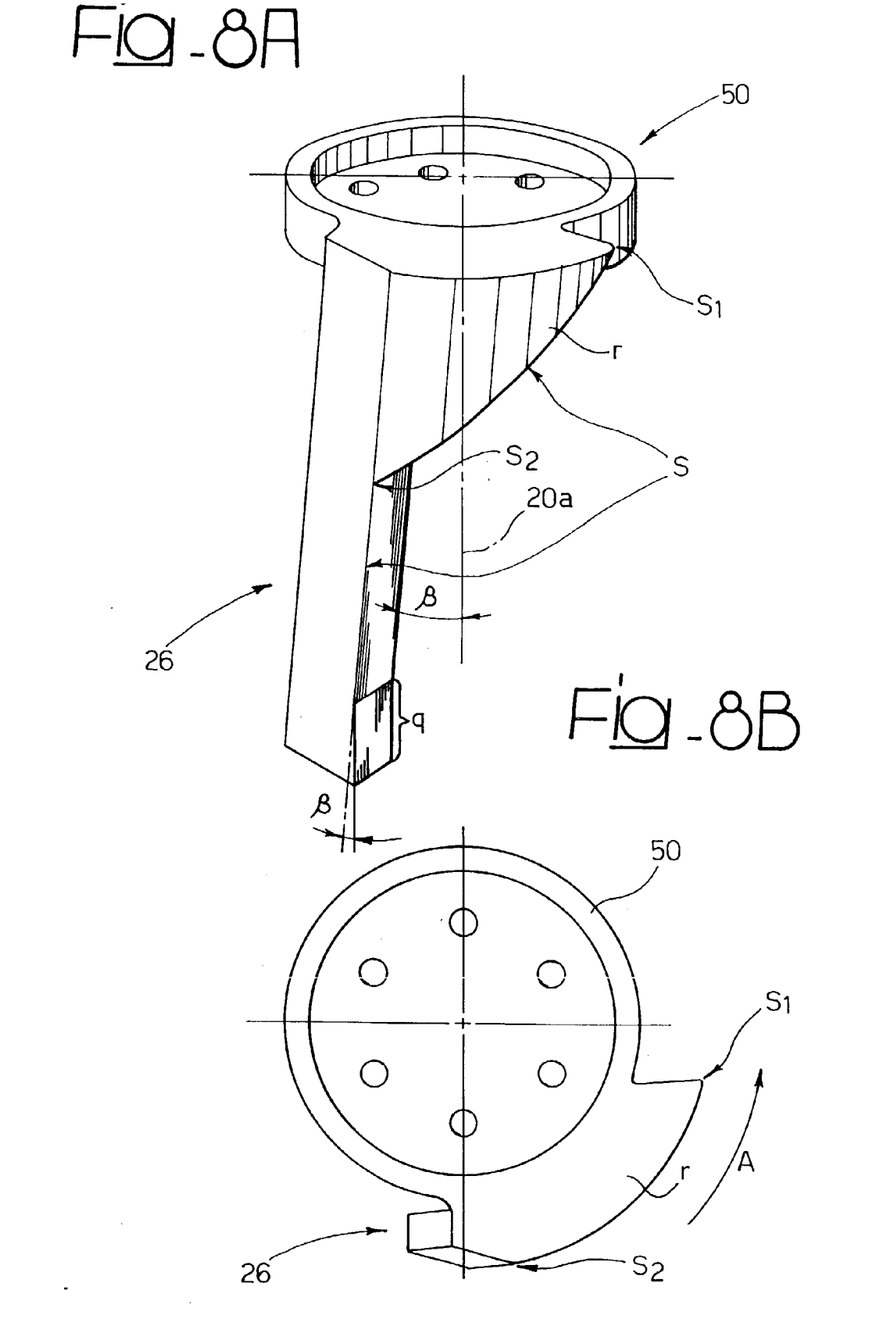
FIGS. 8A, 8B show a perspective view and a plan view of a still further embodiment of a kneading tool of the machine according to the invention.
Figure 9A:
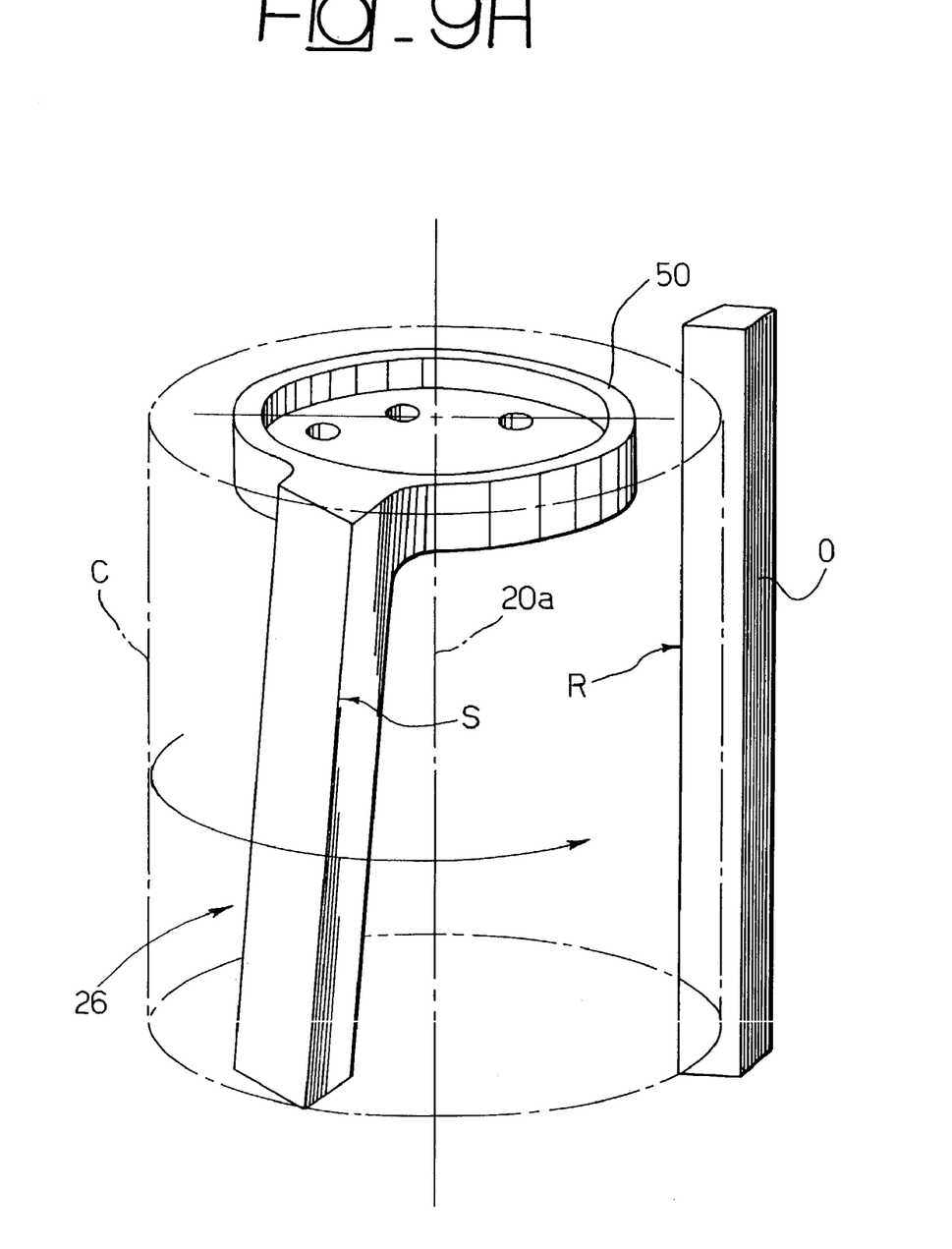
FIGS. 9A, 9B and 10 show a perspective view, a plan view and an elavational view of the kneading members of a variant of the machine according to the invention.
Figure 9B:
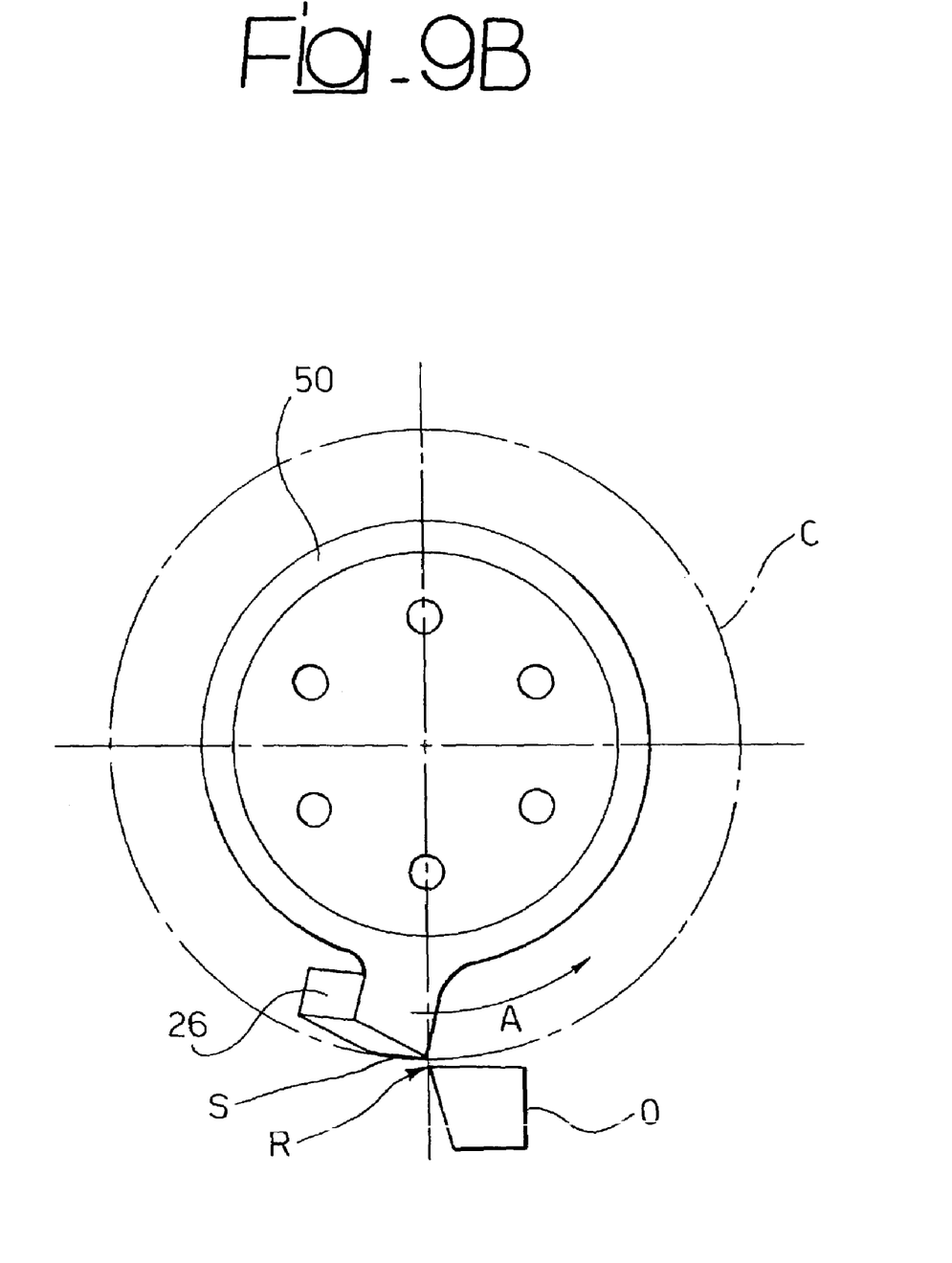
Figure 10:
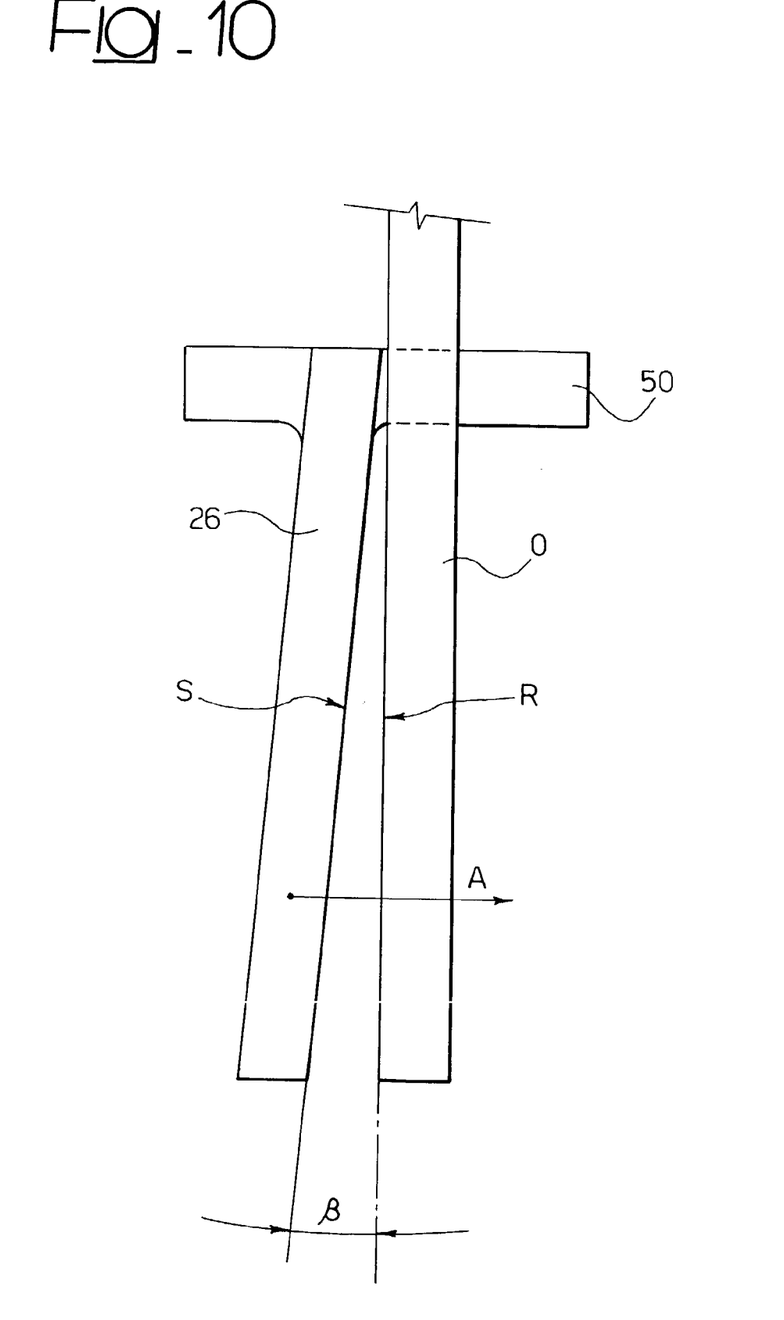

FIGS. 8A, 8B show a further variant which is a combination of the solution of FIGS. 6A, 6B and 7A, 7B since it has an arm 26 inclined by an angle β with respect to a generatrix of the respective theoretical cylinder, as in the case of the solution shown in FIGS. 7A, 7B, and is further provided with a root portion r, as in the case of the solution shown in FIGS. 6A, 6B. The parts in common to those figures are designated by the same reference numbers. Furthermore, in the case of the solution of FIGS. 8A and 8B, the arm 26 has a lower end portion q which has its front face (again with reference to the direction of rotation of the arm) which is parallel to any generatrix of the theoretical cylinder of the tool. This feature is clearly visible in FIG. 8A, where it has been shown that the front face of this end portion also forms an angle β with respect to the corresponding face of the upper part of the arm, the angle β being the angle of inclination of arm 26 with respect to the generatrix of the theoretical cylinder. Due to this feature, the end portion q does not compress the dough against the bottom of the bowl and increases the trailing effect on the dough during kneading. The dough is less able to escape from the action of the tools which thus can cause a greater lengthening and stretching effect on the dough.

FIGS. 9A, 9B, 10 and 11 relate to a further embodiment of invention which has a single kneading tool 26, shaped according to any of the variants provided in the embodiment which has been previously described for both the kneading tools. In the case illustrated in FIGS. 9A, 9B, 10, 11, the kneading tool 26 is of the type shown in FIGS. 7A, 7B. However, as indicated, it could have any of the configurations of FIGS. 5, 6 and 8, or even a further alternative configuration. In the case of this second embodiment, the single kneading tool 26 cooperates with a fixed cooperating member O which is supported at a fixed position within the bowl by the head 12 of the machine, which projects above the bowl. As shown in the drawings, in the illustrated example the fixed cooperating member O is in form of a substantially straight bar directed parallel to any generatrix of the theoretical cylinder C defined by the kneading tool, 26 in its rotation around axis 20a. The cooperating member O is further arranged substantially tangent to this theoretical cylinder and preferably has a cross-section in form of a trapezium (FIG. 9B) substantially corresponding to that of kneading arm 26, defining a cutting edge R which cooperates with the cutting edge S of arm 26 each time that the arm passed across the cooperating member O in order to obtain the required cutting effect.

Naturally, it is also possible to arrange the cooperating member O according to a direction which is slightly inclined with respect to a generatrix of the theoretical cylinder defined by tool 26, similarly to what has been described for tool 26 with reference to FIGS. 7, 8. Theoretically, the fixed member O could also have a cutting edge R with an extension corresponding to that of the cutting edge S of arm 26 of the solution of FIG. 6.

Naturally, a different choice of the angle which is defined between arm 26 of the kneading tool and the fixed cooperating member O causes a different scissors-like cutting effect between the cutting edges S, R.

Figure 11:
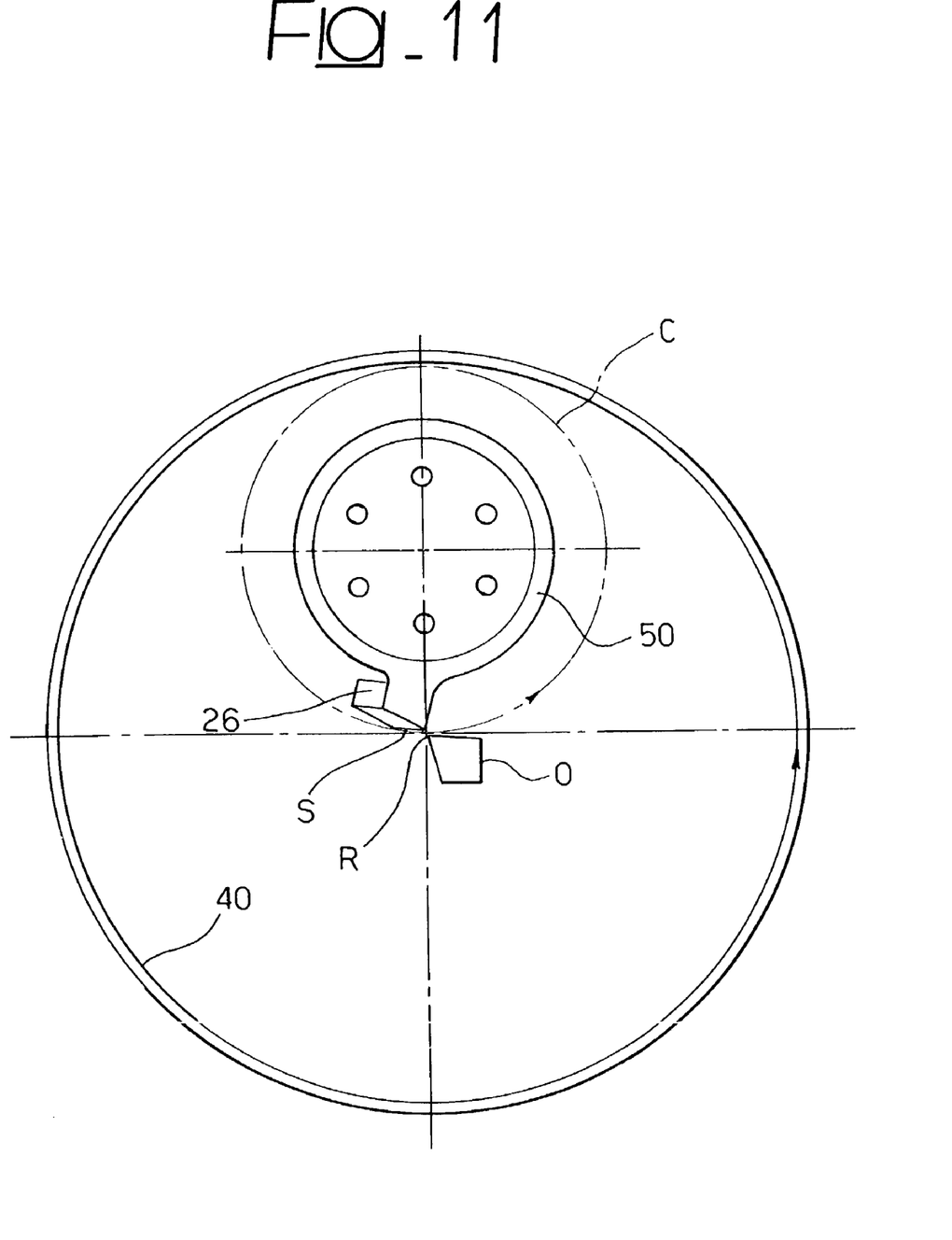
FIG. 11 is a plan view of the machine of FIGS. 9, 10.

FIG. 11 shows a plan view of the machine provided according to this second embodiment, where the cutting edge R of the fixed cooperating member O is arranged at the axis of the bowl. It is also visible that in this solution the theoretical cylinder C of the kneading tool has a diameter which is substantially identical to the inner radius of the bowl.

Naturally, further variants are also possible as far as the arrangement of the fixed cooperating member O and hence the dimensioning of the theoretically cylinder C is regarded.

Naturally, moreover, while the principle of the invention remains the same, the details of construction and the embodiments may widely vary with respect to what has been described and illustrated purely by way of example.

For instance, although all the embodiments described herein have a rotating bowl, the provision is not excluded of a machine having a fixed bowl and a dimensioning of the kneading tools and/or a suitable number greater than two of kneading tools, in order to ensure that the entire product contained within the bowl is sufficiently kneaded, although the bowl is not rotating.

The invention claimed is:

1. Kneading machine, comprising:
   a substantially cylindrical bowl, and
   at least two kneading tools which are rotatable within the bowl, around two axes substantially parallel to the axis of the bowl so as to define two theoretical volumes which are substantially tangent both to each other, and to the circumferential wall of the bowl,
   wherein each kneading tool consists essentially of:
   a shaft rotatably supported by a support structure of the kneading machine;
   a support rigidly connected to the lower end of the shaft,
   a single arm or blade having an upper end rigidly connected to said support, and a lower free end, said single arm or blade being radially spaced apart from the rotation axis of said shaft so that said single arm or blade extends substantially on the periphery of the respective theoretical volume, so that said single arm or blade has an orbital movement around the respective axis of rotation, wherein said single arm or blade is substantially straight at least for a portion of its length and arranged along a direction substantially parallel or slightly inclined with respect to a longitudinal axis of the respective theoretical volume,
   wherein said at least two kneading tools being rotatable within the bowl with the same direction of rotation, and
   wherein means are provided for driving rotation of the two kneading arms around their respective axes of rotation so that said arms have orbital movements around their respective axes of rotation which are synchronized with each other, so that the arms pass substantially simultaneously at the area where the respective theoretical volumes are tangent to each other, crossing each other with opposite directions of movements, due to that the two tools rotate in the same direction.

2. Kneading machine according to claim 1, wherein the two above mentioned theoretical volumes have substantially identical diameters, substantially identical heights, and that the speed of rotation of the arms are also substantially identical.

3. Kneading machine according to claim 1, wherein each of said theoretical volumes has a diameter which is sufficiently great so that said theoretical volume is not contained within the limits of a quarter of the bowl defined between two orthogonal planes which both contain the axis of the bowl.

4. Kneading machine according to claim 1, wherein the two kneading tools are the only members which are present within the bowl.

5. Kneading machine according to claim 1, wherein the two kneading arms have respective cutting edges which are located opposite to each other when the two arms cross each other.

6. Kneading machine according to claim 5, wherein the arms have a cross-section in form of a sector of a circle.

7. Kneading machine according to claim 5, wherein the arms have a polygonal cross-section.

8. Kneading machine according to claim 1, wherein the bowl is rotatable around its axis in the same direction of rotation as the direction of rotation of the kneading tools, and in that the tangential speed of the wall is lower than the tangential speed of the arms of the kneading tools.

9. Kneading machine according to claim 1, wherein each arm has a length such that it comes with one of its ends in close proximity to the bottom of the bowl.

10. Kneading machine according to claim 1, wherein each of said arms form an angle between 0° and 10° (including these values) with respect to a longitudinal axis of the theoretical volume of the kneading tool.

11. Kneading machine according to claim 10, wherein at least one of said arms is arranged inclined with respect to said longitudinal axis, so that the lower end of the arm is offset rearwardly relative to the upper end with respect to the direction of movement of the arm around its respective axis of rotation.

12. Kneading machine according to claim 10, wherein at least one of said arms is arranged inclined with respect to said longitudinal axis and has a lower end portion having at least one front face (with reference to the direction of rotation) which is parallel to said longitudinal axis.

13. Kneading machine according to claim 10, wherein at least one of said arms extends from an upper disc for coupling to a respective driving shaft, through a root portion of substantially triangular shape, having a width progressively decreasing downwardly from the coupling disc.

14. Kneading machine according to claim 13, wherein said root portion has one edge lying on the theoretical volume defined by the arm and strongly inclined with respect to a longitudinal axis of this theoretical volume, said edge being connected with a cutting edge of the lower part of the arm or blade.

15. Kneading machine comprising:
   a substantially cylindrical bowl,
   at least one kneading tool which is rotatable within the bowl around an axis substantially parallel to the axis of the bowl, so as to define a theoretical cylindrical volume substantially tangent to the circumferential wall of the bowl, and
   a fixed cooperating member arranged within the bowl at a position substantially tangent to the theoretical cylindrical volume of the kneading tool, and extending substantially the length of the theoretical cylindrical volume,
   wherein the kneading tool consists essentially of:
   a shaft rotatably supported by a support structure of the kneading machine;
   a support rigidly connected to the lower end of the shaft; and
   a single arm or blade having an upper end rigidly connected to said support and a lower free end, said single arm or blade being radially spaced apart from the rotational axis of said shaft to that said single arm or blade extends substantially on the periphery of the respective theoretical volume, so that said single arm or blade has an orbital movement around the respective axis of rotation, and wherein both the single arm or blade of the at least one kneading tool and the cooperating member are substantially straight at least for a part of their lengths and are arranged along a direction substantially parallel or slightly inclined with respect to a longitudinal axis of the theoretical volume of the kneading tool.

16. Kneading machine according to claim 15, wherein the at least one kneading tool and the cooperating member are the only members present within the bowl.

17. Kneading machine according to claim 15, wherein the at least one kneading tool and the cooperating member have respective cutting edges which are located opposite to each other when the at least one kneading tool passes adjacent to the cooperating member.

18. Kneading machine according to claim 17, wherein the arms have single arm or blade of the at least one kneading tool has a polygonal cross-section.

* * * * *